Aug. 17, 1965 J. C. MILLER 3,201,595

MEMORY SYSTEMS USING TUNNEL DIODES

Filed June 16, 1959 2 Sheets-Sheet 1

INVENTOR.
JAMES C. MILLER
BY John V. Regan
ATTORNEY

INVENTOR.
JAMES C. MILLER
BY John V. Regan
ATTORNEY

United States Patent Office 3,201,595
Patented Aug. 17, 1965

3,201,595

MEMORY SYSTEMS USING TUNNEL DIODES

James Cobean Miller, Hamilton Square, N.J., assignor to Radio Corporation of America, a corporation of Delaware Filed June 16, 1959, Ser. No. 820,672
16 Claims. (Cl. 307—88.5)

This invention relates to memory systems, and particularly to memory systems using semiconductor storage elements.

Prior memory systems include those of the so-called diode-capacitor type. In these prior memories, binary information is represented by the stored charge or absence thereof in the capacitor elements. For example, the two binary digits may be represented by the presence or absence, respectively, of any appreciable stored charge. One of the problems with memory systems of the diode-capacitor type involves the leakage of the stored charge in a finite period of time. One method used to reduce the amount of leakage is to use high resistance elements, say in the order of a megohm or more, rather than lower resistance elements, connected in the discharge path of each capacitor. However, in relatively large memory systems, a myriad of such resistances are required in order to avoid all possible low resistance discharge paths. Even with these high resistances, the stored information still is required to be regenerated after a given time interval. The regeneration operation includes reading each storage portion of the memory, determining the digit stored in that position, and then rewriting the same digit back into the same storage position. It is desirable to avoid such regeneration operation. Also, the high discharge resistance increases the power loss of such prior systems.

It is an object of the present invention to provide improved memory systems of the diode-capacitor type.

Another object of the present invention is to provide improved memory systems of a diode-capacitor type capable of retaining stored information without requiring any regeneration operations.

A further object of the present invention is to provide improved memory systems of the diode-capacitor type capable of operating at a relatively high speed and which use relatively small power in their operation.

In accordance with the present invention, the information is stored in a field storage type device such as a linear capacitor or a linear inductor, or both, and the stored information is retained in the device by means of a hold circuit including one or more negative resistance diodes coupled to the storage device. Any suitable means may be used for applying the desired storage signal to the storage element. According to a further feature of the invention, the storage device is arranged in a tuned circuit with the information being represented by the presence or absence, respectively, of oscillations.

Figures 1, 2, 3, 4, 5, 6, 7, 8, 9:
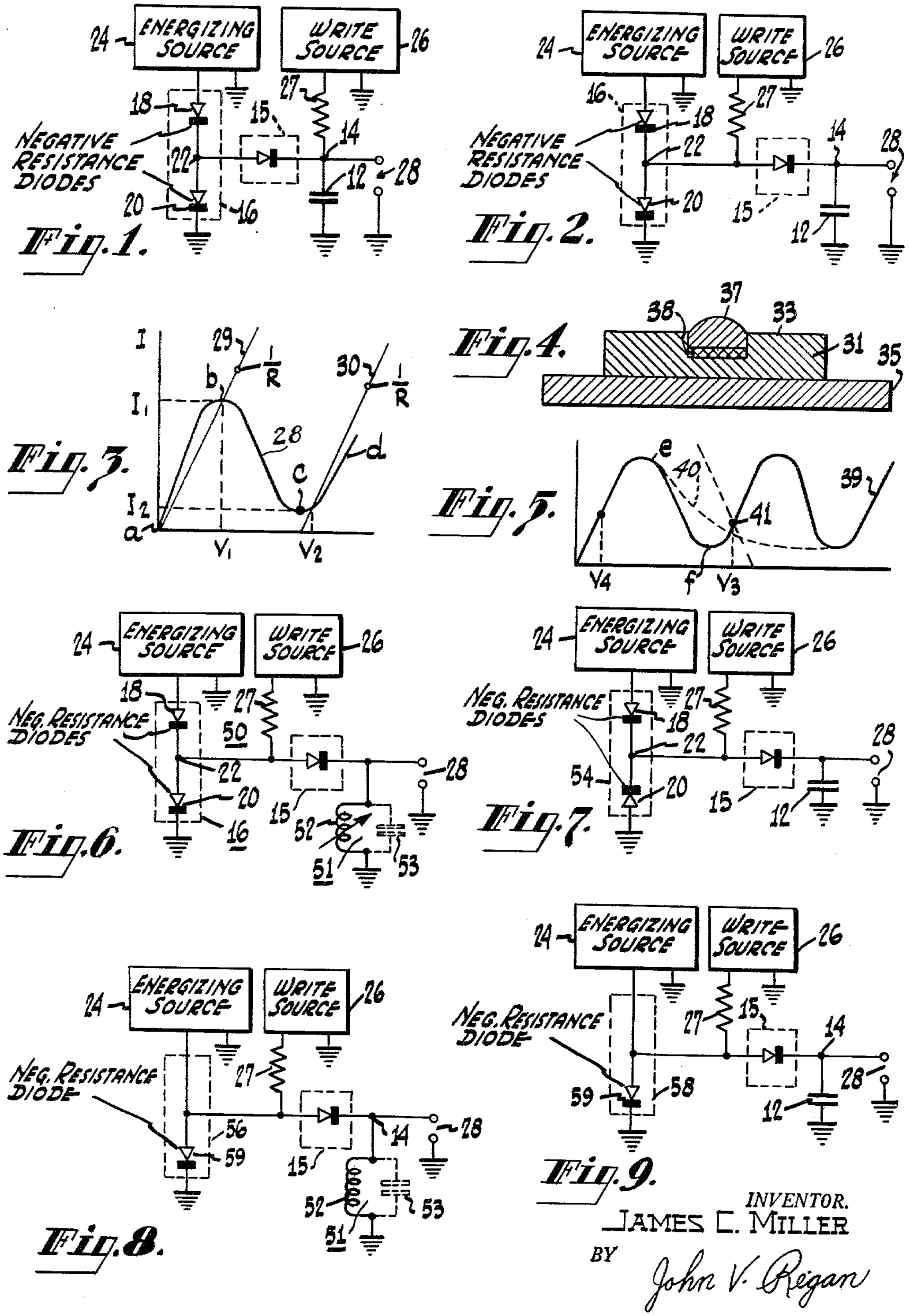
FIG. 1 is a schematic diagram of one embodiment of a memory system according to the invention.
FIG. 2 is a schematic diagram of another embodiment of a memory system according to the invention having a write source differently connected from that of FIG. 1.
FIG. 3 is a schematic diagram of the current versus voltage characteristic curve for a negative resistance diode suitable for use in the system of FIG. 1.
FIG. 4 is a schematic diagram in sectional view of one form of negative resistance diode suitable for use in the present invention.
FIG. 5 is a composite current versus voltage characteristic of the two series-connected negative resistance diodes of FIG. 1.
FIG. 6 is a schematic diagram of another embodiment of a memory system according to the invention using an inductance element.
FIG. 7 is a schematic diagram of an embodiment of the invention using a pair of negative resistance diodes with their cathodes connected to a common junction in back-to-back relation.
FIG. 8 is a schematic diagram of an embodiment of the invention using a single resistance diode in conjunction with a tuned circuit.
FIG. 9 is a schematic diagram of an embodiment of the invention using a single negative resistance diode in conjunction with a storage capacitor.

The memory system of FIG. 1 includes an information storage device, such as a linear capacitor 12, having its upper plate connected at a junction point 14. The lower plate of the capacitor 12 is connected to a point of common reference potential, indicated in the drawing by the conventional ground symbol. A decoupling element 15 connects the junction point 14 to a hold circuit 16. As indicated in the drawing, the decoupling element 15 may be a conventional diode rectifier, connected for easy direction of positive conventional current flow from the hold circuit 16 to the junction point 14. The diode serves to retard the discharge of the capacitor 12 in the high voltage state, as described more fully hereinfater. If desired, the decoupling element may be a linear resistor. In practice, a decoupling element having an impedance of from 10 to 1000 ohms at the operating frequency is suitable. The hold circuit serves to maintain the storage device in a desired set condition. In FIG. 1, the hold circuit 16 includes a pair of negative resistance type diodes 18 and 20 connected in series with each other in the same sense. The decoupling element 15 is connected to a mid-point 22 between the two diodes 18 and 20. An energizing source 24 is connected across the hold circuit 16.

Binary information is stored in the capacitor 12 by means of a write source 26 which is resistor-coupled via a decoupling resistor 27 to the junction point 14. A pair of output terminals 28 are connected across the storage capacitor 12. The write source 26 and the energizing source 24 each is provided with a ground connection.

The energizing source 24 may be any source of periodic energizing signals, for example, a sinusoidal source, or a unidirectional pulse type source having a suitable repetition rate. Preferably, the energizing source 24 is of the constant-voltage type, and the write source 26 is of the constant-current type. However, a constant-current source may be used for both the sources 24 and 26, if desired. A suitable constant-current source for the energizing source 24 is one having an internal impedance of the same order as the average positive resistance value of the diodes as described more fully hereinafter. For example, germanium type diodes may have an average positive resistance of from 1 to 10 ohms.

The write source 26 also may be resistor-coupled to the mid-point 22 of the hold circuit 16 as shown in the embodiment of FIG. 2. The other elements of FIG. 2 are arranged similarly to those of FIG. 1. In FIGS. 1 and 2 and each of the other figures herein corresponding elements are designated by corresponding reference numerals.

The characteristic curve 28 of FIG. 3 represents a plot of the current flowing through a negative resistance diode as a function of the applied voltage across the diode. The curve 28 has a negative resistance region between the points *b* and *c* and two positive resistance regions between the points *a*, *b* and *c*, *d*, respectively. The reciprocal of the average slope of the positive resistance regions *a*, b and c, d corresponds to the average positive resistance value of the diodes 18 and 20 as indicated by the lines 29 and 30. In the region V1 to V2 of the characteristic curve 28 of FIG. 3 energizing voltages increasing in amplitude above the critical value V1 cause a corresponding decrease in diode current flow from a relatively high value I1 towards a relatively low value I2 due to the negative resistance of the diode. Further increases of the energizing voltage above the value V2 cause further increases of the diode current in conventional fashion. The point b at a maximum of the characteristic curve represents a so-called "break" point. The negative resistance diodes may be of the type described by L. Esaki in an article published in the Physical Review, Volume 109, page 603 (1958). The characteristic curve 28 is exhibited by a semiconductor diode of the degenerate type having a narrow or abrupt junction.

Another type of negative resistance diode is shown in cross-sectional view in FIG. 4. The diode of FIG. 4 may be fabricated as follows: a single crystal bar of n-type germanium is doped with arsenic to have a donor concentration $4.0 \times 10^{19}$ $cm.^{-3}$ by methods conventional in the semiconductor art. This may be accomplished, for example, by pulling a crystal from molten germanium containing the requisite concentration of arsenic. A wafer 31 is cut from the bar along the 111 plane, i.e. a plane perpendicular to the 111 crystallographic axis of the crystal. The wafer 31 is etched to a thickness of about two mils in a conventional etch solution. A major surface of the wafer 31 is soldered to a strip 35 of nickel, with a conventional lead-tin-arsenic solder, to provide a non-rectifying contact between the wafer 31 and the strip 35. The nickel strip 35 serves eventually as a base lead. A five mil diameter dot 37 of 99 percent by weight indium, 0.5 percent by weight zinc and 0.5 percent by weight gallium is placed with a small amount of a commercial flux on the free surface 33 of the germanium wafer 31 and then heated at 450° C. for one minute in an atmosphere of dry hydrogen to alloy a portion of the dot to the free surface 33 of the wafer 31, and then cooled rapidly. In the alloying step, the unit is heated and cooled as rapidly as possible so as to produce an abrupt p-n junction 38. The unit is then given a final dip etch for five seconds in a slow iodide etch solution, followed by rinsing in distilled water. A suitable slow iodide etch is prepared by mixing one drop of a solution comprising 0.55 gram potassium iodide, and 100 $cm.^3$ water in 10 $cm.^3$ of a solution comprising 600 $cm.^3$ concentrated nitric acid, 300 $cm.^3$ concentrated acetic acid, and 100 $cm.^3$ concentrated hydrofluoric acid. A pigtail connection may be soldered to the dot where the device is to be used at ordinary frequencies. Where the device is to be used at high frequencies, contact may be made to the dot 37 with a low impedance lead.

The curve 39 of FIG. 5 is a composite characteristic curve, as seen from the energizing source 24, of the two series-connected diodes 18 and 20 of FIG. 1. The curve 39 represents the condition wherein one of the diodes 18 and 20 "breaks" before the other. If the two diodes 18 and 20 exhibited identical characteristics, both would "break" at approximately the same energizing voltage and the composite characteristic between the points e and f would be that somewhat as represented by the dotted line 40. In practice, however, the circuit is arranged so that only one of the diodes 18 and 20 "breaks" at a time. Thus, the entire solid curve 39 is the one of interest in the present invention. The load line 41 of the curve 39 corresponds to the normal operating condition when one but not both of the diodes 18 or 20 is in the high voltage state and the other is in the low voltage state. The slope of the load line 41 is determined by the internal impedance of the energizing source 24. The energizing source 24 is arranged so that the peak energizing signal amplitude is less than that required to "break" both of the diodes 18 and 20 in succession.

A relatively high voltage V3 appears at the junction point 14 when the lower diode 20 breaks first, and a relatively low voltage V4 appears at the junction point 14 when the upper diode 18 breaks first. The decoupling element 15 effectively limits any discharge current flow in a path including the storage capacitor 12, the decoupling element 15, the hold circuit mid-point 22, the diodes 18 and 20, and the common ground.

The write source 26 is used to select the one of the two diodes 18 and 20 which "breaks" first. A current of one polarity, for example, positive flowing in the conventional direction from the write source 26 to the junction point 14, causes the lower diode 20 to "break" first. The relatively high voltage V3 (FIG. 5) is then applied across the storage capacitor 12. The write signal either is made of longer duration than an energizing pulse, or is synchronized by any suitable means (not shown) to occur during the negative phase of an alternating polarity energizing signal. Preferably, the write source 26 in FIGURE 1 is synchronized with the energizing source. The write pulse leading edge is transmitted via the distributed capacitance (not indicated) of the decoupling element diode to the junction point 22. The lower diode 20 is held at the thus set operating point by the signals of positive polarity from the energizing source 24. A negative polarity write current pulse applied from the write source 26 to the junction point 14 causes the upper diode 18 to assume the high voltage condition. The storage capacitor 12 (FIGURE 1) then discharges through the write source 26 to the relatively small amplitude voltage V4 (FIG. 5) developed across the lower diode 20. Again, the energizing signals hold the diode 18 in the high voltage condition even after termination of the write signal. The positive and negative write pulses may be of relatively large amplitude to perform the writing operation in a relatively short time, say as fast as one to ten millimicroseconds. Note that by discharging the capacitor 12 through the write source 26, that the writing speed is independent of the frequency or repetition rate of the energizing source 24.

Accordingly, the storage capacitor 12 is charged either to the relatively high voltage V3 or the relatively low voltage V4 in a one-to-one correspondence with the positive and negative polarity write signals from the source 26. The hold circuit 16 operates to maintain the capacitor 12 at the set value until a new write cycle is applied to the memory circuit. The maximum frequency, in case of sinusoidal type signals, or repetition rate, in case of pulse type signals, of the energizing signals is limited by the time required for a diode 18 or 20 to change from the high to the low voltage condition. In practice, a finite time is required for the diode to change to the low voltage condition due to the internal capacitances of the material itself. These internal capacitances, for a given negative resistance type diode; may vary between, say 100 and 1,000 micro-microfarads. Accordingly, the energizing source 24 is chosen so that the RC time constant of the negative resistance diodes is relatively short compared to a half-cycle of a sinusoidal source, or to the spacing interval between successive pulses for a pulse source. Each write signal applied by the write source 26 is made of an amplitude large enough so that the diode 20 is brought to either the high or the low voltage condition regardless of its previous state. That is, each new write signal overrides any previously stored write signal to cause the storage capacitor 12 to assume either the high or the low voltage state in correspondence with the new write signal.

The memory system 50 of FIG. 6 is similar to that of the system of FIG. 2 except that the storage device is provided by a tuned circuit 51. The tuned circuit 51 includes a variable inductance element 52 and a capacitor 53. The tuned circuit capacitor 53 may be provided by the distributed capacitance of the inductance element 52, indicated by the dotted capacitor 53. The inductance of element 52 is tuned to resonate at the frequency of the energizing source signals. A series tuned or a parallel tuned circuit may be used. For example, the capacitor 53 may be an external capacitor connected in series with or in parallel with the inductance element 52 to provide the tuned circuit 51.

The mode of operation of the circuit of FIG. 6, however, is different from that of the circuits of FIGS. 1 and 2. When a negative polarity write signal is applied, the lower diode 20 is changed to the relatively low voltage condition and no voltage, or at most, a relatively small voltage, is applied across the storage inductor 52. This relatively small amplitude signal appearing across the output terminals 28 represents one of the stored digits. When a positive polarity write signal is applied, the lower diode 20 is changed to its high voltage condition and a relatively high voltage is applied across the inductor 52. This relatively high voltage is applied to the tuned circuit 51 and excites the tuned circuit 51 to resonance. The frequency of the energizing source 24 is at or close to the resonant frequency of the tuned circuit 51, and therefore, each positive polarity signal from the energizing source 24 together with the energy stored in the tuned circuit 51 sustains the resonance. The oscillations of the tuned circuit 51 build-up to a relatively large amplitude. The tuned circuit 51 remains oscillating until a new negative polarity write signal is applied to quench the oscillations. The storage of the other binary digit thus is represented in the memory circuit 50 by continuous oscillations appearing across the output terminals 28.

The negative resistance diodes of the hold circuit can also be connected in back-to-back relation as shown for the hold circuit 54 of FIG. 7. In the hold circuit 54, the diodes 18 and 20 each have like electrodes, for example, their cathodes connected at the mid-point 22. The remaining portions of the memory system of FIG. 7 may be similar to those of the previously described memory circuits.

The operation of the memory system of FIG. 7 is similar to that described for the memory system of FIGS. 1 and 2. Either a relatively large or a relatively small output voltage appears across the output terminals 28 to represent the storage of the one and the other binary digits, respectively.

The hold circuit also may be arranged to have a single negative resistance diode as shown for the hold circuits 56 and 58 of FIGS. 8 and 9, respectively. In each of these hold circuits, a single negative resistance diode 59 has one electrode, for example, the anode connected to the output of the energizing source and has the cathode connected to ground. The anode of the negative resistance diode 59 is coupled via the decoupling element 15 to the junction 14. The memory system of FIG. 8 includes the tuned circuit storage device 51, and the memory system of FIG. 9 includes the capacitor storage device 12.

The operation of the circuit of FIG. 8 is similar to that described for the system of FIG. 6 except that it does not provide gain. That is, in the system of FIG. 6 using a pair of negative resistance diodes 18 and 20, the output signal appearing across the output terminals 28 may be of larger amplitude, current-wise, than that of the write signal used to establish the storage device in a desired one of the two stable states. In the system of FIG. 8 however, using a single negative resistance diode, the output signal appearing across the output terminals 28 is of about equal amplitude, current-wise, to that of the write signals used to set the device into the desired stable states.

The memory system of FIG. 9 operates in the manner described above for the systems of FIGS. 1, 2 and 7 with the exception that the system of FIG. 9 does not provide current gain.

Figure 10:
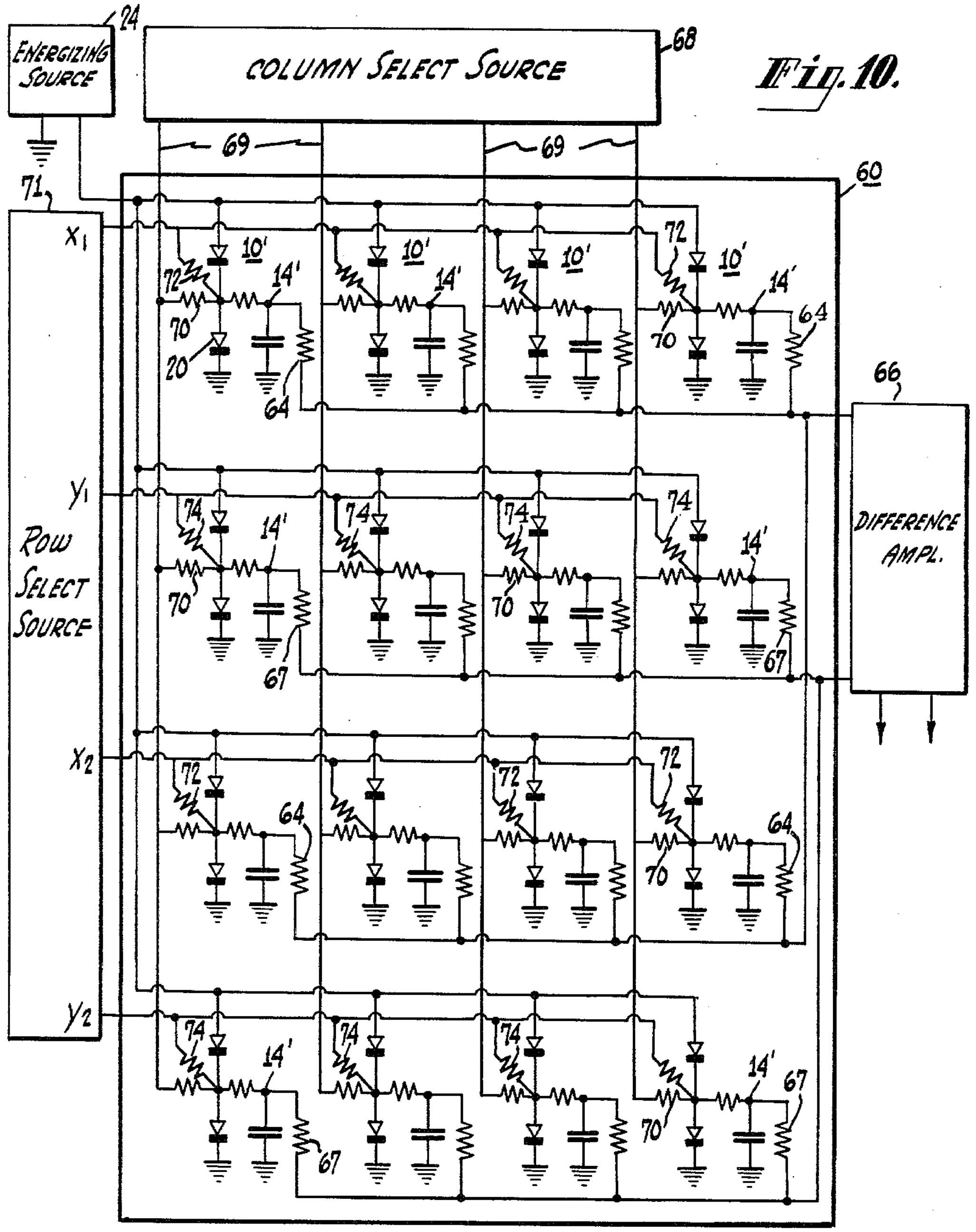
FIG. 10 is a schematic diagram of a memory array using a negative resistance diode.

A plurality of the memory systems of the invention may be advantageously arranged in a two-dimensional storage array as indicated in the exemplary array 60 of FIG. 10.

The array 60 has, for example, a 4 x 4 array of memory systems 10′, each similar to that of FIG. 2 with the exception that the decoupling element 15 is provided by a linear resistor. The sixteen memory systems 10′ are used to store eight binary digits. The four systems 10′ in the odd numbered rows of the array 60 are paired with the four systems 10′ in the even numbered rows of the array 60. A common energizing source 24 is coupled to all the memory systems 10′ of the array. A common ground return is provided between each of the systems 10′ and the energizing source 24. The systems 10′ of the first and third rows have their junction points 14′ coupled via a different one of eight decoupling resistors 64 to a first input on a difference amplifier 66. The junction points 14′ of the second and fourth rows are similarly coupled via a different one of eight decoupling resistors 67 to the second input of the difference amplifier 66. Because the same binary digit is stored in an odd row and a paired even row system 10′, the sum of the inputs on the first input of the difference amplifier 66 equals the sum of the inputs on its second input. A column select source 68 and a row select source 71 are used to write a binary digit into a desired one of the memory elements 10′ in coincident current fashion. The four outputs of the column select source 68 are connected respectively to the four column lines 69 of the array 60. A different decoupling resistor 70 couples the respective column lines to the respective memory systems 10′. The row select source 71 is provided with first and second pairs of output lines. The first pair of output lines $x1$ and $x2$ are coupled via different decoupling resistors 72 to the junction points 14′ of the first and third rows, respectively, of memory systems 10′. The second pair of row output lines $y1$ and $y2$ are coupled via separate decoupling resistors 74 to the junction points 14′ of the second and fourth rows, respectively, of memory systems 10′.

Information is written into both systems 10′ of a desired pair of memory systems 10′ by concurrently applying a signal to the one column line 69 linking these desired systems 10′ and concurrently applying a like polarity signal to the one $x$ and one $y$ line of that pair of systems 10′. The coincidence of the column and row signals at the desired pair of memory systems 10′ causes the one or the other of the diodes 18 and 20 to break down in each of these systems 10′, thereby storing the desired binary digit.

The stored information is read out from any desired pair of memory systems 10′ by activating the one column line 69 and one but not both of the $x$ or $y$ lines of that pair of systems 10′. For example, the one row line activated during a read operation may be the row line $x2$ for the pairs of systems 10′ of the first and third rows, or the row line $y2$ for the pairs of systems 10′ of the second and fourth rows. The one column line and the one row line currents are together of sufficient amplitude to change one of the systems 10′ of the selected pair to one state, say, the high voltage state. If the selected systems 10′ were initially in the high voltage state, there is no net change of voltage across the differential amplifier 66. If the selected systems 10′ were initially in the low voltage state, a relatively large amplitude signal change appears across the differential amplifier 66. In the latter case, after the read operation is terminated, the selected row and column lines may be activated with opposite polarity currents to return the changed system 10′ to its initial low voltage condition.

New information may be written into the same or any other pair of systems 10′ by applying suitable polarity writing signals to the column and row lines of that pair of elements.

What is claimed is:

1. A memory system comprising a field effect storage device having two operating states, a hold circuit including a negative resistance diode element, said diode having a high and a low voltage operating state corresponding to the one and the other of said storage device operating states, a decoupling element connecting said diode to said storage device, means coupled to said storage device and also coupled across said diode to set said storage device to one of its two operating states and to also set said diode in the corresponding one of said high and low states, and means for applying energizing signals across said diode to maintain said set state.

2. A memory system including a field effect storage device having two operating states, a hold circuit including a pair of negative resistance diodes each having high and low voltage states, a junction point, said diodes being connected to each other at said junction point, a decoupling element connecting said junction point to said storage element, and means coupled to said storage device and to said junction point for setting said storage device in one of said two states and for setting said diodes to mutually opposite states corresponding to the set state of said storage device.

3. A memory system as recited in claim 2, said storage device being a capacitor.

4. A memory system as recited in claim 2, said storage device being an inductance element having a distributed capacitance.

5. A memory system as recited in claim 2, said storage device comprising a tuned circuit.

6. A memory system comprising an inductance and a capacitance coupled to each other in a tuned circuit, a hold circuit comprising a pair of negative resistance diodes each connected at a junction point, said tuned circuit being coupled across one of said diodes, means for applying periodic signals across both said diodes, said inductance and capacitance being tuned to resonate at the frequency of said periodic signals.

7. A memory system comprising a storage capacitor, the amount of charge stored in said capacitor representing digital information, and means for maintaining said stored charge comprising a hold circuit having a pair of negative resistance diodes connected in series with each other at a junction point, said diodes each having a high and a low voltage operating state, a decoupling element connecting said junction point to said capacitor, means for applying energizing signals across said diodes, and means for setting a desired one of said diodes to said high voltage state and the other of said diodes to said low voltage state, said energizing signals jointly with said stored charge maintaining said diodes in said set states.

8. A memory system comprising a storage element for storing binary information signals, output terminals connected across said storage element, a signal of one type being produced across said output terminals when a binary "1" signal is stored in said element, a signal of another type being produced across said output terminals when a binary "0" is stored in said element, a hold circuit including a negative resistance diode, said diode having high and low operating states corresponding, respectively, to storage of said "1" and "0" signals in said storage element, a decoupling element having a first terminal connected to said hold circuit and a second terminal connected to said storage element, means for applying write signals across said storage element and across said negative resistance diode to store either a binary "1" signal or a binary "0" signal in said storage element and to set said diode correspondingly in either its said high or low operating state, and means for applying periodic energizing signals across said hold circuit to maintain the storage of the thus written binary signal in said storage element.

9. A memory system as recited in claim 8, said storage element comprising a capacitor, said one and other type signals being voltages of relatively high and low amplitudes, respectively.

10. A memory system as recited in claim 8, said storage element comprising a tuned circuit, said one and other type signals being the presence and absence of oscillations, respectively.

11. A memory system as recited in claim 8, said hold circuit including a pair of negative resistance diodes connected in series with each other, and said first terminal being connected at a mid-point between said pair of diodes.

12. A memory system comprising a plurality of memory elements arranged in a matrix having rows and columns, each of said elements comprising a storage device, a hold circuit including at least one negative resistance diode, and a decoupling element connected between said hold circuit and said storage device, means for applying energizing signals to all said hold circuits, a plurality of column lines each coupled to all the hold circuits of a different one of said columns, a plurality of row lines each coupled to all the hold circuits of a different one of said rows, and a difference amplifier having first and second inputs, said first input being coupled to all the hold storage devices of alternate ones of said rows, and said second input being coupled to all the storage devices of the remaining ones of said rows.

13. A memory system as recited in claim 12, each of said hold circuits including a pair of negative resistance diodes connected in series with each other.

14. A memory system comprising a storage element, a pair of negative resistance diodes, a diode rectifier, first and second junction points, each of said negative resistance diodes and said diode rectifier having one electrode connected at said first junction point, said diode rectifier other electrode and said storage element being connected at said second junction point, means for applying a pulse of either one or the other polarity to one of said first and second junction points, and means for applying energizing signals across said pair of negative resistance diodes.

15. A memory system as recited in claim 14, said pair of negative resistance diodes being connected in series with each other with corresponding ones of their electrodes being connected to said first junction point.

16. A memory system as recited in claim 14, said pair of negative resistance diodes being connected in series with each other with non-corresponding ones of their electrodes being connected to said first junction point.

References Cited by the Examiner

UNITED STATES PATENTS

| | | | |
|---|---|---|---|
| 2,614,140 | 10/52 | Kreer | 307—88.5 |
| 2,760,087 | 8/56 | Felker | 340—173 |
| 2,824,222 | 2/58 | Furlow | 340—173 |
| 2,862,139 | 11/58 | Williams | 340—173 |
| 2,879,409 | 3/59 | Holt | 307—88.5 |
| 2,922,143 | 1/60 | Epstein | 340—173 |
| 2,951,980 | 9/60 | Jones et al. | 307—88.5 |
| 2,981,881 | 4/61 | Abbott et al. | 307—88.5 |
| 2,986,724 | 5/61 | Jaeger | 307—88.5 |
| 3,120,653 | 2/64 | Miller et al. | 307—88.5 |

FOREIGN PATENTS

| | | |
|---|---|---|
| 1,172,034 | 2/59 | France. |

JOHN W. HUCKERT, *Primary Examiner.*

EVERETT R. REYNOLDS, HERMAN KARL SAALBACH, ARTHUR GAUSS, *Examiners.*